United States Patent
McCain et al.

(10) Patent No.: US 11,210,628 B2
(45) Date of Patent: Dec. 28, 2021

(54) COMMODITY FULFILLMENT

(71) Applicant: International Business Machines Corporation, Armonk, NY (US)

(72) Inventors: Edward C. McCain, Lagrangeville, NY (US); Pascal R. Bastien, Poughkeepsie, NY (US); Bradley Steen, Fishkill, NY (US); Daniel Alexander Thorne, Wappingers Falls, NY (US); Lucas Dane LaLima, Poughkeepsie, NY (US); Tyler Michael Shiling, Paramus, NJ (US); Emily Venuto, Poughkeepsie, NY (US); Daniela Yaniv, Poughkeepsie, NY (US); Nicholas Ziemis, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 16/790,894

(22) Filed: Feb. 14, 2020

(65) Prior Publication Data
US 2021/0256458 A1    Aug. 19, 2021

(51) Int. Cl.
*G06Q 10/08* (2012.01)
*G06Q 10/06* (2012.01)
(Continued)

(52) U.S. Cl.
CPC ........... *G06Q 10/087* (2013.01); *G06N 5/046* (2013.01); *G06N 20/00* (2019.01);
(Continued)

(58) Field of Classification Search
CPC ........... G05B 2219/15101; G05B 2219/15124; G05B 19/41805; G05B 19/41865
See application file for complete search history.

(56) References Cited

U.S. PATENT DOCUMENTS

| | | | |
|---|---|---|---|
| 8,004,798 B1 * | 8/2011 | Dunn | G11B 5/486 360/245.8 |
| 9,600,779 B2 | 3/2017 | Hoover et al. | |

(Continued)

OTHER PUBLICATIONS

Anonymous, "Machine Learning Based Overall Prediction." ip.com; Jul. 12, 2019. 5 Pages.

(Continued)

*Primary Examiner* — A. Hunter Wilder
(74) *Attorney, Agent, or Firm* — Cantor Colburn LLP; Steven Chiu

(57) ABSTRACT

Aspects of the invention include a computer-implemented method, in which includes determining whether a combination of a first commodity and a computing system satisfies a manufacturing requirement. Additionally, whether a combination of a second commodity and the computing system satisfies the manufacturing requirement is predicted based at least in part on a comparison of the combination of the first commodity and the computing system and the combination of the second commodity and the computing system. Then either the first commodity or the second commodity is inserted into a computer system based at least in part on a comparison of an actual performance of the first commodity and a predicted performance of the second commodity in the computing system.

11 Claims, 4 Drawing Sheets

(51) Int. Cl.
*G06N 20/00* (2019.01)
*G06N 5/04* (2006.01)
*G06Q 50/04* (2012.01)
*G05B 19/418* (2006.01)

(52) U.S. Cl.
CPC ......... *G06Q 10/0639* (2013.01); *G06Q 50/04* (2013.01); *G05B 19/41805* (2013.01); *G05B 19/41865* (2013.01); *G05B 2219/15101* (2013.01); *G05B 2219/15124* (2013.01)

(56) References Cited

U.S. PATENT DOCUMENTS

| | | |
|---|---|---|
| 9,679,261 B1 | 6/2017 | Hoover et al. |
| 9,779,364 B1 | 10/2017 | Hoover et al. |
| 2013/0331975 A1* | 12/2013 | Saulsbury ........ G05B 19/41865 700/117 |

OTHER PUBLICATIONS

Anonymous, "Machine Learning Datasets Generation Box." ip.com:ipcom000254112d; Jun. 1, 2018. 8 Pages.
Anonymous, "Method and System for Optimizing Fulfillment of Online Orders to Reduce Produce Markdowns at a Physical Store." ip.com; Mar. 12, 2019. 5 Pages.
Infosys, "Artificial Intelligence an High-Tech Supply Chains" Google. 2018. 8 Pages.
Qolomany, B. et al., "Leveraging Machine Learning and Big Data for Smart Buildings: A Comprehensive Survey." Google; 2018. 39 Pages.

* cited by examiner

COMMODITY FULFILLMENT

BACKGROUND

The present invention generally relates to computer manufacturing, and more specifically, to commodity fulfillment.

Companies manufacture computers, such as mainframes, servers, personal computers (PCs), workstations, and mobile PCs (laptops, netbooks, and tablets), as well as peripheral equipment, including storage devices, terminals, and input/output devices such as printers, monitors, and keyboards. In conventional manufacturing processes, commodities such as microchips, microprocessor modules, memory modules, I/O cards, graphics cards, and power supplies, are used to design, test, and fabricate computing systems.

SUMMARY

Embodiments of the present invention are directed to commodity fulfillment. A non-limiting example computer-implemented method includes determining whether a combination of a first commodity and a computing system satisfies a manufacturing requirement. Additionally, whether a combination of a second commodity and the computing system satisfies the manufacturing requirement is predicted based at least in part on a comparison of the combination of the first commodity and the computing system and the combination of the second commodity and the computing system. Then either the first commodity or the second commodity is inserted into a computer system based at least in part on a comparison of an actual performance of the first commodity and a predicted performance of the second commodity in the computing system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The figures depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide systems and methods for dynamically selecting a commodity for deployment in a computing system based on a continuous and real-time analysis of available inventory.

A computer manufacturing process may begin by engaging users to learn their activities and work environments. These engagements assist engineers, software analysts, and technicians in determining product requirements for a user's computing system. Based on the requirements, a computing system may be modeled and designed. Upon designing the basic computer product, a manufacturing process is planned, and then afterwards the production planning is performed. In some instances, a prototype of the desired computing system is fabricated prior to full-scale production of the computing system. In this instance, engineers test whether a system will satisfy all required regulations, customer requests, and design specifications prior to fabricating a deliverable system.

However, even after the system's requirements are formalized, a manager still has to manually manage the distribution of commodities to build the various computing systems. Various conventional methods have been employed to increase the efficiency of this process. For example, inventory location and retrieval systems locate and retrieve parts from an inventory. Additionally, flexible kitting methods apply barcodes on unique packaging to identify and track parts. However, conventional methods lack the ability to dynamically respond to real-time changes, address priority shifts, accommodate complex bring-up PCB boards, or process feedback. Furthermore, conventional systems are focused on the current location of a commodity rather than determining an appropriate destination for the commodity.

One or more embodiments of the present invention address one or more of the above-described shortcomings by combining commodities with systems based on past and current real-time data of ideal combinations of commodities and systems.

Figure 1:
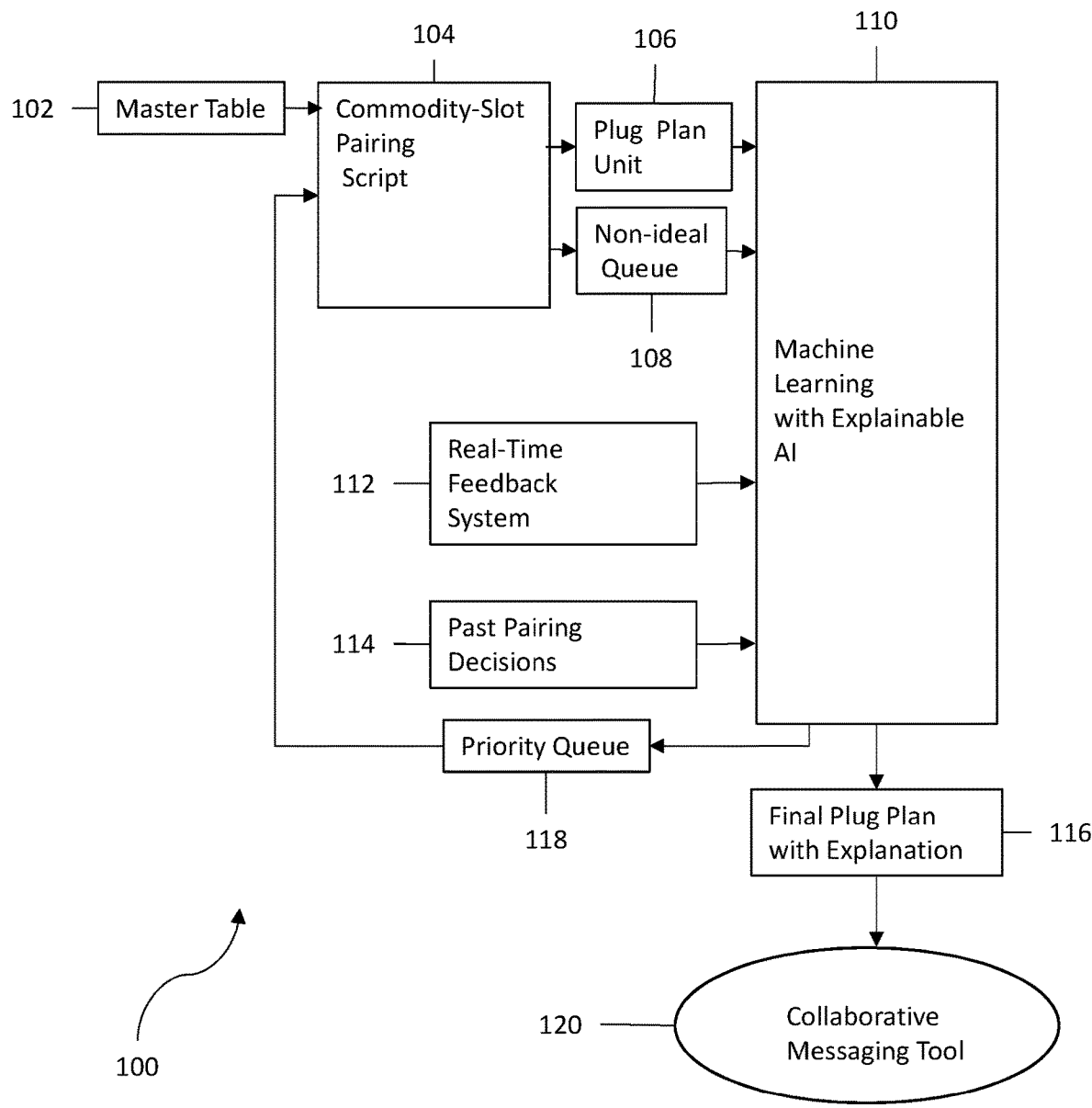
FIG. 1 illustrates a block diagram of components of a commodity fulfillment system in accordance with one or more embodiments of the present invention.

Turning now to FIG. 1, a commodity fulfillment system 100 is generally shown in accordance with one or more embodiments of the present invention. The commodity fulfillment system 100 includes a master table 102, which includes a list of each commodity available in an inventory. The master table 102 includes a database and is operable to provide a description of each commodity to a commodity-slot pairing script unit 104, which includes a set of rules/algorithms that select potential commodities based on whether the commodity fulfills the desired requirements for a system. The commodity-slot pairing script unit 104 is operable to extract features of the commodity from the master table 102, including specifications and locations for each commodity.

The commodity-slot pairing script unit 104 initially creates an initial plug plan and a new non-ideal queue 108, which are transmitted to a machine learning unit 110. The initial plug plan includes a schedule for each system slot to be combined with a commodity. The schedule is based, at least in part on, customer demands, internal goals, commodity availability, and any other appropriate parameter. The initial plug plan is transmitted to the a machine learning unit 110 via the plug plan unit 106, which acts as an interface between the commodity-slot pairing script unit 104 and the machine learning unit 110. The non-ideal queue 108 includes a list of combinations of commodities and system slots that have been identified as non-ideal. A combination is non-ideal if it fails to satisfy a requirement of the final system or if combining the commodity with the slot results in a reduction of the performance below an acceptable threshold level.

The commodity fulfillment system 100 also includes a real-time feedback system 112, which provides the machine learning unit 110 with various real-time test results of commodities and system slot combinations. For example, an engineer may be verifying a first commodity and system slot combination under one verification method, while another engineer may be verifying a second commodity and system slot combination by another verification method. The real-time feedback system 112 provides both test results to the machine learning unit 110. The machine learning unit 110 may evaluate the strengths and weaknesses of each verification method to resolve any difference in results. For example, by providing a weight to each result based on historical data of accuracy of the verification method on the feature. If the historical data suggests the verification method is accurate in regard to a tested feature, the machine learning unit 110 may assign a weight of "1" or other higher value to the result. If, however, the historical data suggests that the verification is inaccurate in regard to the tested feature, the machine learning unit 110 may assign a weight of "0.75", or some other weight lesser than a weight assigned for a historically accurate result.

In another example, a commodity may be inserted into a first system slot in a computing system during one testing instance, and in another instance, a same type of commodity may be inserted in another system slot. The real-time feedback system 112 provides both test results to the machine learning unit 110, which determines the similarities and differences between the slot positions to classify the combinations as ideal or non-ideal based on the positions and the results.

The machine learning unit 110 also receives information from a historical pairing decisions unit 114, which includes a database of descriptions of historical combinations. The machine learning unit 110 analyzes the data received from the initial plug plan, the non-ideal queue 108, the real-time feedback system 112, and the historical pairing decisions unit 114 to classify any tested commodity and system slot combinations as ideal or non-ideal.

The combinations and classifications are further used as training data to teach the machine learning unit 110 to classify potential combinations of commodities and system slots. The machine learning unit 110 uses a statistical analysis to compare the respective features of each tested commodity and system slot to determine a degree of similarity with untested commodities and system slots. In some instances, the machine learning unit 110 determines whether a threshold number of similar features exist between tested and untested commodities and system slots. In other instances, the machine learning unit 110 determines whether a threshold number of features correlate to a performance of the tested commodities and system slot. Therefore, even if a threshold number of similar features exists, a threshold number of similar features related to a performance aspect must also exist to determine that one commodity or system slot is similar to another commodity or system slot. In other instances, the machine learning unit 110 determines the absence of one or more disqualifying features of a commodity or system slot.

Based on the classifications, the machine learning unit 110 creates a final plug plan and creates a priority queue 118. Using natural language processing techniques, the machine learning unit 110 provides an explanation of each commodity and system slot combination provided in the final plug plan. This includes providing test results and comparative charts and graphs. The final plug plan further includes modifications to the schedule provided in the initial plug plan. The priority queue 118 includes a ranked list of each available system slot in order of highest priority. The priority may be based at least in part on a designation of a system as a lead system, customer demand, location of either commodity or system, internal goal, desire for the combination test result, performance, ideal or non-ideal classification, or other appropriate measure. In instances that the system is being run through verification, validation, or other testing process, priority may depend on needing to test a first combination prior to a second combination. The priority queue 118 along with master table 102 feeds into the commodity-system pairing script unit 104, which in turn generates/updates the initial plug plan and non-ideal queue 108.

In some instances, the tested system may be a prototype system. In these instances, the slots of the prototype may be given a higher priority to make up for an increased planning development time. In other instances, if the prototype is of a confidential nature, the machine learning unit 110 may create a segregated priority queue 118, which is only available to individuals with a specific security clearance. In yet even other instances, the system stores combinations of commodities and slots that were ultimately demanded or rejected by a customer or class of customer. For example, if customers in the biotech industry have previously either demanded or rejected a particular power supply and computing system combination, the non-ideal queue 108 may be updated for customer preference, regardless of any provided specification or manufacturing requirements.

In embodiments of the present invention, aspects of the machine learning unit 110 are implemented as machine learning circuitry, neuromorphic systems include interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Multiple pre-neurons and post-neurons can be connected through an array of resistive switching devices (RSDs), which naturally expresses a fully-connected neural network. In the descriptions here, any functionality ascribed to the system that can be implemented using the processing system 400 of FIG. 4 applies.

The machine learning unit 110 system further extracts a layout of each testing device, including the combination of commodities and their placement to rank a priority, which it then transmits to a plug plan unit 116. A plug plan is a description of a schedule and an arrangement of commodities in the slots of a computing system. The plug plan unit 116 is in operable communication with a number of user operated computing devices and at least one actuator operable to insert a commodity into a system slot. The plug plan unit 116 translates the machine learning unit 110 plug plan to a compatible format for each computing system, and further translates the recommendation into a machine language for the actuator. A collaborative messaging tool 120 transmits the plug plan to each computing device and the actuator.

Figure 2:
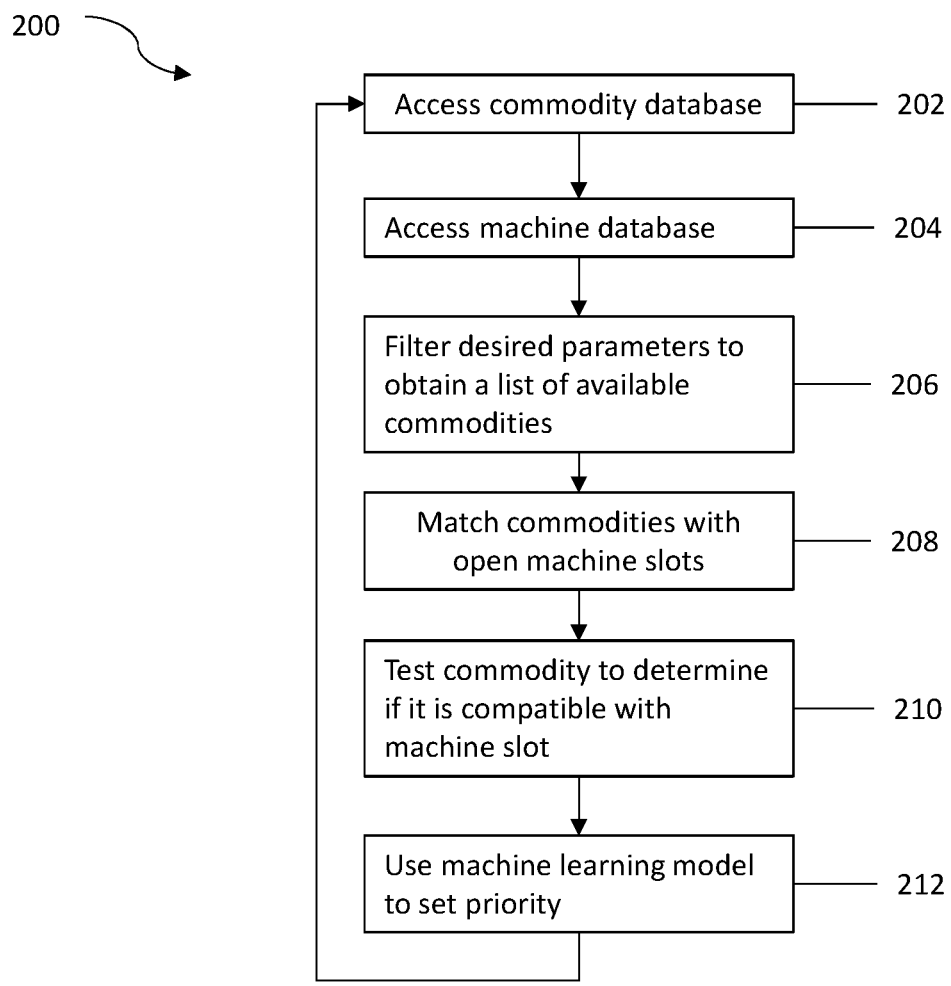
FIG. 2 illustrates a flow diagram of a process for commodity fulfillment in accordance with one or more embodiments of the present invention.

Referring to FIG. 2, a method 200 for building a queue, such as non-ideal queue 108 of FIG. 1, is shown in accordance with one or more embodiments of the present invention. At block 202, the commodity fulfillment system 100 accesses a commodity database, which contains subdivisions of types of commodities by parameters, whether digital or analog, operating frequency, cost, functionality, size, location, or another appropriate parameter. The database further includes an indication of whether each commodity has already been allocated to another computing system. The commodity fulfillment system 100 gathers this information to determine which commodities are available for inserting into an open slot of a computing system.

At block 204, the commodity fulfillment system 100 accesses a machine database, which includes a list of current systems that either have or do not have an open slot for a commodity. The commodity fulfillment system 100 further detects a set of requirements for each computing system, including functionality, I/O pin configuration, computing system floorplan, desired verification method(s), regulatory/legal requirements, and any other appropriate requirements. This further entails determining whether any parallel hardware and software is being developed. In addition to any software and hardware requirements, the commodity fulfillment system 100 further determines whether a time constraint is imposed on the development cycle of the computing system.

At block 206, the commodity fulfillment system 100 filters/tailors a copy of the commodity database from block 202 for commodities that satisfy the requirements identified by block 204. At block 208, the system matches each commodity with a respective available slot on a computing system as per an initial plug plan. The commodity fulfillment system 100 then causes an actuator to install the respective commodities into the computing systems, and tests the computing systems at block 210. For example, via device-specific binary test patterns, which are applied by an automated testing device (ATE) and the system records the signal response to each pattern, stimulus, or other appropriate method.

At block 212, the commodity fulfillment system 100 applies a machine learning model to extract features from a commodity database and a machine database and compares the features to the signal responses to determine which features led to an ideal/non-ideal commodity-computing system pairing. The commodity fulfillment system 100 then embeds information regarding the commodity as metadata into the commodity database and the machine database.

In addition to embedding the metadata, the commodity fulfillment system 100 analyzes the features of each commodity and computing system in the respective databases to predict whether each potential commodity and computing system pair is ideal or non-ideal. This includes chips and computing systems that were previously allocated elsewhere, and commodities and computing systems introduced to the databases after block 202. The commodity fulfillment system 100 applies a discriminate classifier, for example, a support vector machine (SVM), or similarity learning, or metric distance learning to determine a similarity between a tested commodity and computing system and the other untested commodities and computing systems in the database. Therefore, even if a commodity has not been inserted into a particular computing system slot, the commodity fulfillment system 100 may determine whether a commodity would be compatible with the particular computing system. Based on a level of similarity, the commodity fulfillment system 100 embeds metadata for each commodity and computing system in their respective databases. In some embodiments of the present invention, the commodity fulfillment system 100 ranks a priority of each compatible commodity to a computing system based on a similarity to each tested commodity. In other embodiments of the present invention, the commodity fulfillment system 100 designates any commodity whose similarity falls below a threshold value of similarity as non-ideal for certain computing systems. In yet even other embodiments of the present invention, the commodity fulfillment system 100 provides recommendations for commodity selection based on their features, any requirements, and any desired functionality.

Figure 3:
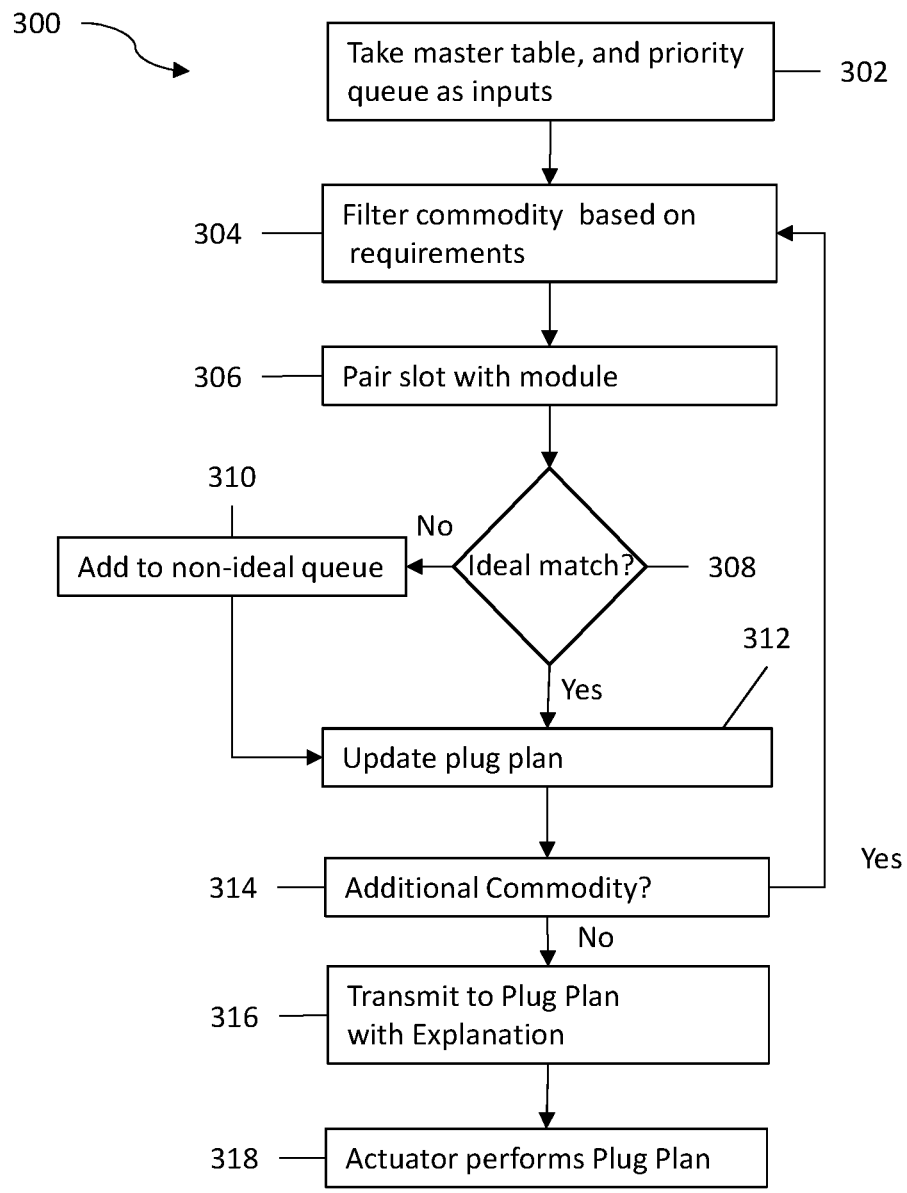
FIG. 3 illustrates a flow diagram of a process for commodity fulfillment in accordance with one or more embodiments of the present invention.

Referring to FIG. 3, a method 300 for a second iteration for pairing a commodity with a computing system is shown in accordance with one or more embodiments of the present invention. At block 302, the commodity fulfillment system 100 receives an inventory of available commodities and a prioritized list of system slots. At block 304, the commodity fulfillment system 100 filters the commodities based on any manufacturing requirements, including the legal, functional, and design requirements for the computing system and determines a list of compatible commodities. At block 306, the commodity fulfillment system pairs a compatible commodity with an open system slot. At block 308 the commodity fulfillment system 100 determines whether the commodity is ideal for the computing system. If the commodity is non-ideal for the computing system, a description of the combination of the commodity and the system slot is added to a non-ideal queue at block 310. If the commodity is ideal for the computing system, a plug plan is updated to schedule similar commodities into similar computing systems at block 312. At block 314, the commodity fulfillment system 100 determines whether there are additional commodities, then repeats the testing process for each additional commodity at block 304. At block 316, the commodity fulfillment system 100 transmits a final plug plan and explanation, providing a layout for a completed computer system to a user's computing device and an actuator. At block 318, the actuator executes the plug plan.

It should be appreciated that in some instances, more than one type, iteration, or version of a commodity element and computing system combination is classified as ideal. For example, a tested commodity and computing system slot combination that has been verified is designated as ideal. Additionally, the machine learning unit 110 may have classified a second commodity and computing system slot as ideal. In this situation, the system may determine which combination to include in a final plug plan between either combination based on, for example, cost, performance, time constraints, actual testing versus classification/prediction, or other appropriate parameter.

Figure 4:
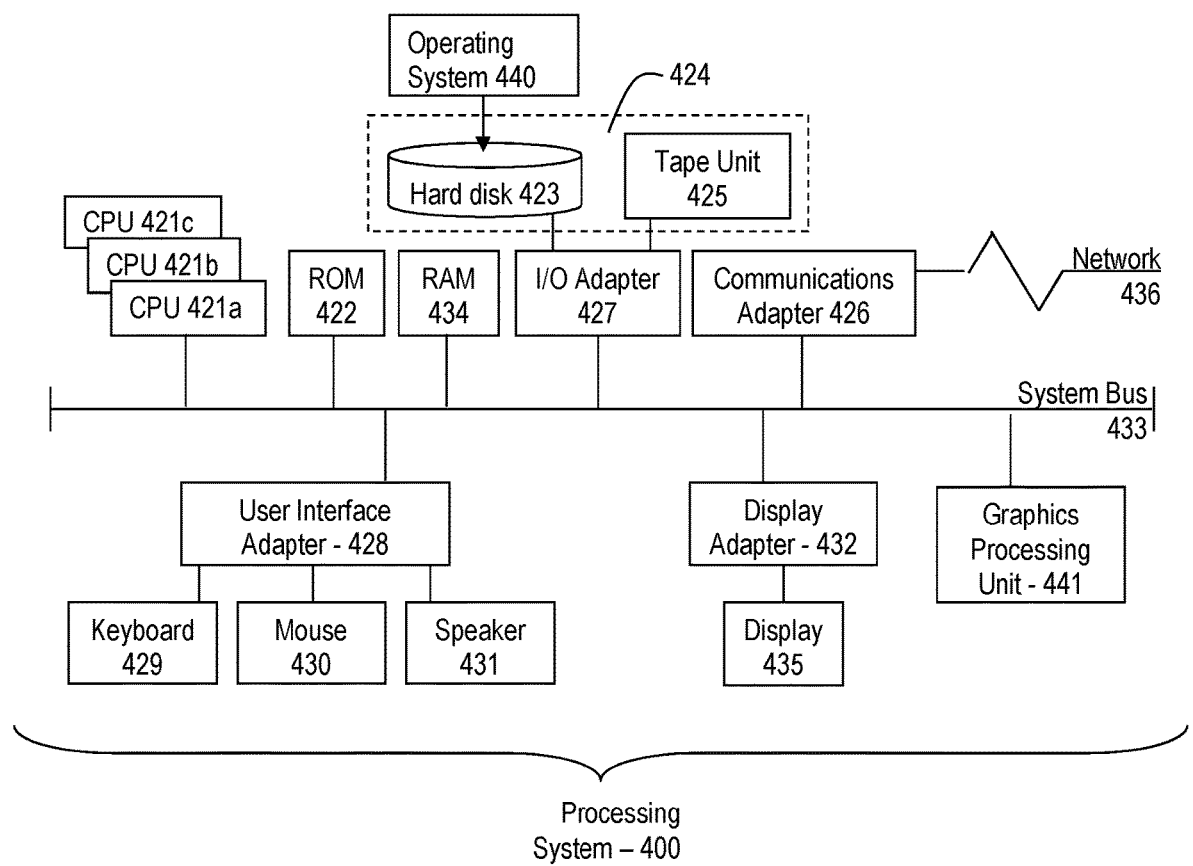
FIG. 4 depicts a block diagram of a computer system for use in implementing one or more embodiments of the present invention.

It is understood that the present disclosure is capable of being implemented in conjunction with any other type of computing environment now known or later developed. For example, FIG. 4 depicts a block diagram of a processing system 400 for implementing the techniques described herein. In examples, the processing system 400 has one or more central processing units (processors) 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of the processing system 400.

Further depicted are an input/output (I/O) adapter 427 and a network adapter 426 coupled to the system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to the system bus 433 by display adapter 432, which may include a graphics adapter to improve the performance of graphics intensive applications and a video controller. In one aspect of the present disclosure, adapters 426, 427, and/or 432 may be connected to one or more I/O busses that are connected to the system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. An input device 429 (e.g., a keyboard, a microphone, a touchscreen, etc.), an input pointer 430 (e.g., a mouse, trackpad, touchscreen, etc.), and/or a speaker 431 may be interconnected to system bus 433 via user interface adapter 428, which may include, for example, a Super I/O chip integrating multiple device adapters into a single integrated circuit.

In some aspects of the present disclosure, the processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing and has a highly parallel structure that makes it more effective than general-purpose CPUs for algorithms where processing of large blocks of data is done in parallel.

Thus, as configured herein, the processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in the processing system 400.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by one or more processors, whether a combination of a first commodity and a first computing system slot satisfies a manufacturing requirement, wherein determining whether the combination of the first commodity and the computing system slot satisfies the manufacturing requirement comprises introducing a stimulation signal to the first commodity and analyzing a signal response;
   correlating, by the one or more processors, an actual performance of the first commodity in the first computing system slot to one or more features of the first commodity;
   predicting, by the one or more processors, whether a combination of a second commodity and the first computing system slot satisfies the manufacturing requirement based at least in part on a comparison of the combination of the first commodity and the first computing system slot and the combination of the second commodity and the first computing system slot, wherein predicting whether the combination of the second commodity and the first computing system slot satisfies the manufacturing requirement is performed by machine learning circuitry based at least in part on an extracted feature of the second commodity from a description in a first database and the signal response;
   correlating, by the one or more processors, a predicted performance of the second commodity in the first computing system slot to the extracted features of the second commodity;
   comparing, by the one or more processors, the actual performance of the first commodity and the predicted performance of the second commodity in the first computing system; and
   transmitting, by the one or more processors and to an actuator, selection of either the first commodity or the second commodity into a second computer system slot based on the comparison, wherein the actuator inserts either the first commodity or the second commodity into the second computer system slot based on the selection.

2. The computer-implemented method of claim 1, further comprising: selecting the second commodity based on a comparison of the one or more correlated features of the first commodity and one or more features of the second commodity.

3. The computer-implemented method of claim 1, further comprising: embedding metadata regarding whether the combination of the first commodity and first computing system slot satisfies the manufacturing requirement into a description of the first commodity in the first database.

4. The computer-implemented method of claim 1, further comprising:
   retrieving a description of the first commodity from the first database, the first database comprising a description of each commodity available.

5. A system comprising:
   a memory having computer readable instructions; and
   one or more processors for executing the computer readable instructions, the computer readable instructions controlling the one or more processors to perform operations comprising:
       determining whether a combination of a first commodity and a first computing system slot satisfies a manufacturing requirement, wherein determining whether the combination of the first commodity and the computing system slot satisfies the manufacturing requirement comprises introducing a stimulation signal to the first commodity and analyzing a signal response;
       correlating an actual performance of the first commodity in the first computing system slot to one or more features of the first commodity;
       predicting whether a combination of a second commodity and the first computing system slot satisfies the manufacturing requirement based at least in part on a comparison of the combination of the first commodity and the first computing system slot and the combination of the second commodity and the first computing system slot, wherein predicting whether the combination of the second commodity and the first computing system slot satisfies the manufacturing requirement is performed by machine learning circuitry based at least in part on an extracted feature of the second commodity from a description in a first database and the signal response;

correlating a predicted performance of the second commodity in the first computing system slot to the extracted features of the second commodity;

comparing the actual performance of the first commodity and the predicted performance of the second commodity in the first computing system; and transmitting, to an actuator, selection of either the first commodity or the second commodity into a second computer system slot based on the comparison, wherein the actuator inserts either the first commodity or the second commodity into the second computer system slot based on the selection.

6. The system of claim 5, wherein the operations further comprise:

selecting the second commodity based on a comparison of the one or more correlated features of the first commodity and one or more features of the second commodity.

7. The system of claim 5, wherein the operations further comprise: embedding metadata regarding whether the combination of the first commodity and first computing system slot satisfies the manufacturing requirement into a description of the first commodity in the first database.

8. The system of claim 5, wherein the operations further comprise: retrieving a description of the first commodity from the first database, the first database comprising a description of each commodity.

9. A computer program product comprising a non-transitory computer readable storage medium having program instructions embodied therewith, the program instructions executable by a processor to cause the processor to perform operations comprising:

determining whether a combination of a first commodity and a first computing system slot satisfies a manufacturing requirement, wherein determining whether the combination of the first commodity and the computing system slot satisfies the manufacturing requirement comprises introducing a stimulation signal to the first commodity and analyzing a signal response;

correlating an actual performance of the first commodity in the first computing system slot to one or more features of the first commodity;

predicting whether a combination of a second commodity and the first computing system slot satisfies the manufacturing requirement based at least in part on a comparison of the combination of the first commodity and the first computing system slot and the combination of the second commodity and the first computing system slot, wherein predicting whether the combination of the second commodity and the first computing system slot satisfies the manufacturing requirement is performed by machine learning circuitry based at least in part on an extracted feature of the second commodity from a description in a first database and the signal response;

correlating a predicted performance of the second commodity in the first computing system slot to the extracted features of the second commodity;

comparing the actual performance of the first commodity and the predicted performance of the second commodity in the first computing system; and transmitting, to an actuator, selection of either the first commodity or the second commodity into a second computer system slot based on the comparison, wherein the actuator inserts either the first commodity or the second commodity into the second computer system slot based on the selection.

10. The computer program product of claim 9, wherein the operations further comprise: selecting the second commodity based on a comparison of the one or more correlated features of the first commodity and one or more features of the second commodity.

11. The computer program product of claim 9, wherein the operations further comprise: embedding metadata regarding whether the combination of the first commodity and first computing system slot satisfies the manufacturing requirement into a description of the first commodity in the first database.

* * * * *